(12) United States Patent
Tang et al.

(10) Patent No.: US 7,747,669 B2
(45) Date of Patent: Jun. 29, 2010

(54) ROUNDING OF BINARY INTEGERS

(75) Inventors: Ping Tak (Peter) Tang, Castro Valley, CA (US); John R. Harrison, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 1062 days.

(21) Appl. No.: 11/394,735

(22) Filed: Mar. 31, 2006

(65) Prior Publication Data

US 2007/0233774 A1    Oct. 4, 2007

(51) Int. Cl.
G06F 7/52    (2006.01)

(52) U.S. Cl. ................................ 708/650; 708/654

(58) Field of Classification Search .......... 708/650–656
See application file for complete search history.

(56) References Cited

U.S. PATENT DOCUMENTS

| | | | |
|---|---|---|---|
| 5,563,818 A * | 10/1996 | Agarwal et al. | ............. 708/400 |
| 2004/0254973 A1 | 12/2004 | Tang et al. | |
| 2005/0027775 A1 | 2/2005 | Harrison et al. | |
| 2005/0289208 A1 | 12/2005 | Harrison et al. | |

* cited by examiner

*Primary Examiner*—Tan V Mai
(74) *Attorney, Agent, or Firm*—Caven & Aghevli LLC

(57) ABSTRACT

Methods and apparatus to provide rounding of a binary integer are described. In one embodiment, a value that indicates whether a divisor divides a binary integer is extracted from a product of the binary integer and a scaled approximate reciprocal of the divisor.

30 Claims, 8 Drawing Sheets

ROUNDING OF BINARY INTEGERS

BACKGROUND

The present disclosure generally relates to the field of electronics. More particularly, an embodiment of the invention relates to rounding of binary integers.

When performing arithmetic computations, some computers may use circuitry that operates on binary bits. Some applications (such as financial applications) may, however, operate on decimal integers, and in some situations the results of any division or rounding may need to be accurate.

To provide an accurate result, decimal numbers may be represented in binary form. For example, seven bits (e.g., "1111111") may be used to represent the decimal number "127" in its binary form. Such a binary representation may allow the circuitry designed for binary operations to perform certain tasks (such as addition and multiplication) relatively quickly, but using the same circuitry for rounding decimal numbers (e.g., such as in a division by 10 or 100) may result in performance loss, in part, because it may involve several computational cycles. Alternatively, decimal numbers may be represented through binary coded decimal (BCD) encoding, where four binary bits are used to represent each decimal integer. Accordingly, twelve bits may be used to represent the decimal number "127" instead of seven bits discussed previously. However, while BCD representations may ensure correctness in some situations, these representations may also result in performance loss, in part, because the logic circuitry would have to operate on a relatively larger number of binary bits.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

Figure 1:
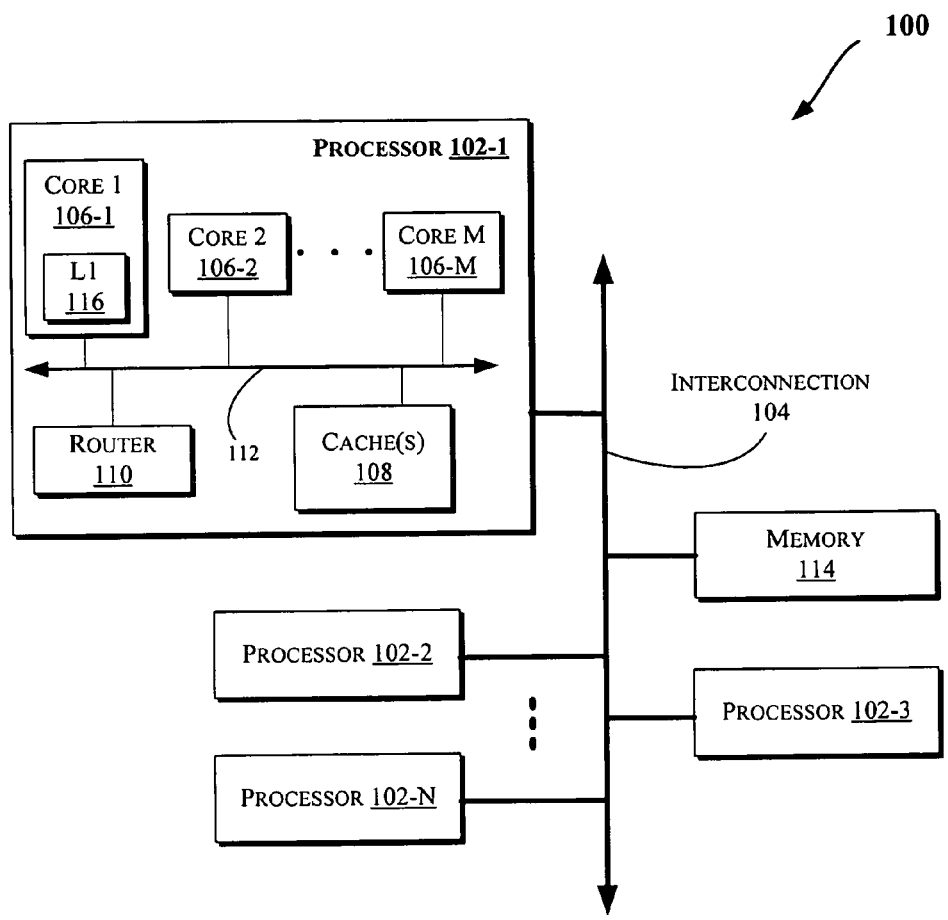
FIGS. 1, 7, and 8 illustrate block diagrams of embodiments of computing systems, which may be utilized to implement various embodiments discussed herein.

Some of the embodiments discussed herein may provide efficient and/or less computationally intensive methods and/or apparatus for performing base-10 rounding of binary integers. For example, some of the techniques discussed herein may round binary integers by utilizing relatively less computationally intensive and/or expensive operations (e.g., multiplication and/or addition, rather than division) in a processor core, such as the processor cores discussed with reference to FIGS. 1-8. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as one or more caches 108), buses or interconnections (such as a bus or interconnection 112), memory controllers, or other components. In one embodiment, the router 110 may be used to communicate between various components of the processor 102-1 and/or system 100. Moreover, the processor 102-1 may include more than one router 110. Furthermore, the multitude of routers (110) may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102. As shown in FIG. 1, the memory 114 may be in communication with the processors 102 via the interconnection 104. In an embodiment, the cache 108 may be a level 2 (L2) cache or a last level cache (LLC). Also, each of the cores 106 may include a level 1 (L1) cache (116) (generally referred to herein as "L1 cache 116"). Furthermore, the processor 102-1 may also include a mid-level cache that is shared by several cores (106). Various components of the processor 102-1 may communicate with the cache 108 directly, through a bus (e.g., the bus 112), and/or a memory controller or hub.

Figure 2:
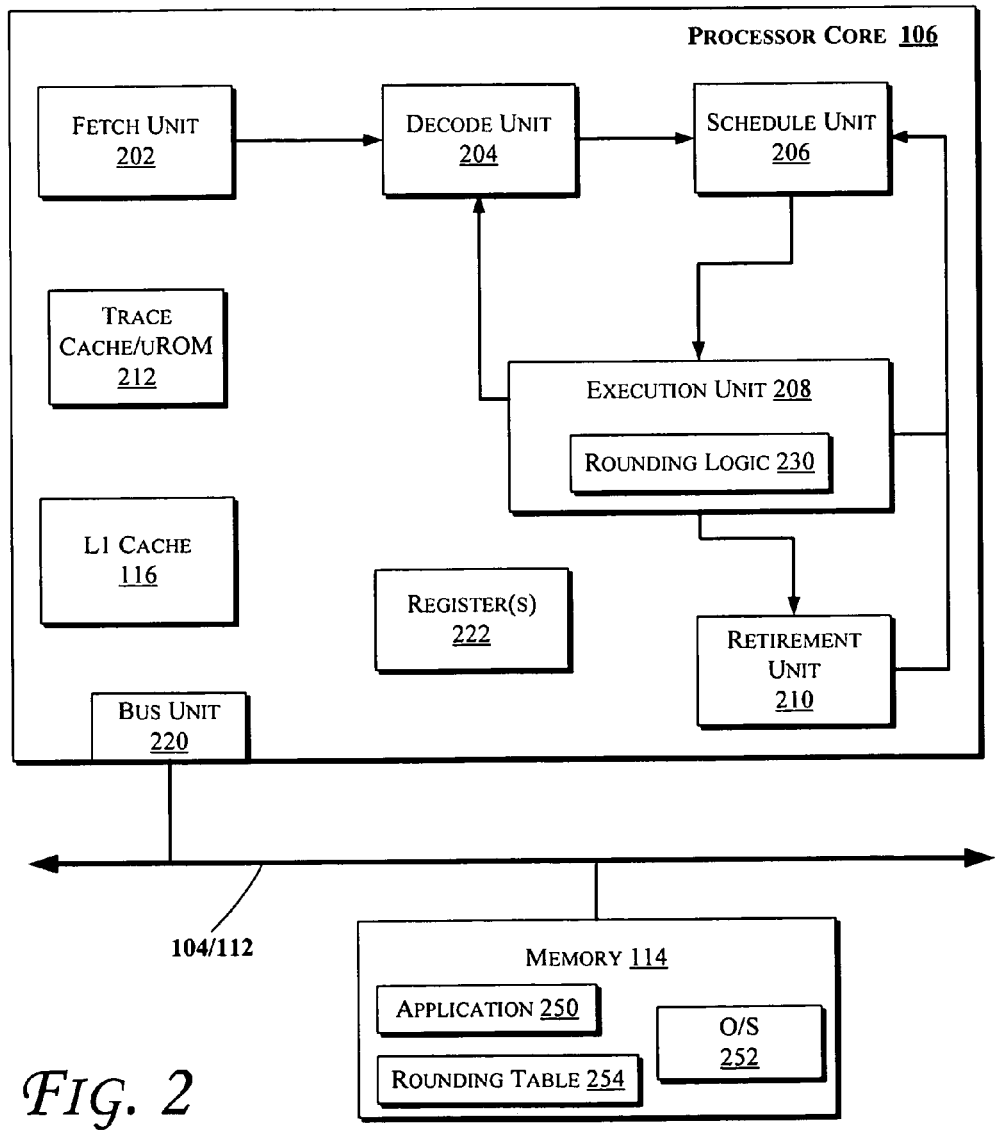
FIG. 2 illustrates a block diagram of portions of a processor core, according to an embodiment of the invention.

FIG. 2 illustrates a block diagram of portions of a processor core 106, according to an embodiment of the invention. In one embodiment, the arrows shown in FIG. 2 illustrate the flow direction of instructions through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), memory controllers, or other components. In an embodiment, the processor cores 106 shown in FIGS. 1-2 may be utilized to execute one or more operations that correspond to rounding of binary integers as will be further discussed herein, e.g., with reference to FIG. 3.

As illustrated in FIG. 2, the processor core 106 may include a fetch unit 202 to fetch instructions for execution by the core 106. The instructions may be fetched from any storage devices such as the memory 114 and/or the memory devices discussed with reference to FIGS. 7 and 8. The core 106 may also include a decode unit 204 to decode the fetched instruction. For instance, the decode unit 204 may decode the fetched instruction into a plurality of uops (micro-operations). Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available. In one embodiment, the schedule unit 206 may schedule and/or issue (or dispatch) decoded instructions to an execution unit 208 for execution. The execution unit 208 may execute the dispatched instructions after they are decoded (e.g., by the decode unit 204) and dispatched (e.g., by the schedule unit 206). In an embodiment, the execution unit 208 may include more than one execution unit, such as a memory execution unit, an integer execution unit, a floating-point execution unit, or other execution units. The execution unit 208 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 208.

Further, the execution unit 208 may execute instructions out-of-order. Hence, the processor core 106 may be an out-of-order processor core in one embodiment. The core 106 may also include a retirement unit 210. The retirement unit 210 may retire executed instructions after they are committed. In an embodiment, retirement of the executed instructions may result in processor state being committed from the execution of the instructions, physical registers used by the instructions being de-allocated, etc.

The core 106 may additionally include a trace cache or microcode read-only memory (uROM) 212 to store microcode and/or traces of instructions that have been fetched (e.g., by the fetch unit 202). The microcode stored in the uROM 212 may be used to configure various hardware components of the core 106. In an embodiment, the microcode stored in the uROM 212 may be loaded from another component in communication with the processor core 106, such as a computer-readable medium or other storage device discussed with reference to FIGS. 7 and 8. The core 106 may also include a bus unit 220 to allow communication between components of the processor core 106 and other components (such as the components discussed with reference to FIG. 1) via one or more buses (e.g., buses 104 and/or 112). The core 106 may include one or more registers 222 to store various types of data, such as the data discussed with reference to FIGS. 3-6. In an embodiment, the registers 222 may be provided as variables stored in the cache 116.

As will be further discussed herein, e.g., with reference to FIGS. 3-6, the core 106 (and in an embodiment the execution unit 208) may include a rounding logic 230 to perform one or more operations corresponding to rounding of binary integers. Moreover, the memory 114 may store a software application 250 which may include instructions corresponding to a rounding operation request. The memory 114 may further store an operating system (O/S) 252 which may be utilized to communicate with various components of the computing systems of FIGS. 1 and 7-8. The memory 114 may also include a rounding table 254 that may store various data used to perform rounding of binary integers as will be further discussed herein, e.g., with reference to FIGS. 3-6. Moreover, even though FIG. 2 illustrates that the table 254 is stored in the memory 114, table 254 may be stored in other components discussed with reference to FIGS. 1-2 and 7-8. For example, the cache 116 and/or cache 108 may store the table 254 instead of or in addition to the memory 114. Also, the table 254 may be stored in a volatile storage device and/or non-volatile storage device, such as those discussed with reference to FIG. 7.

Figure 3:
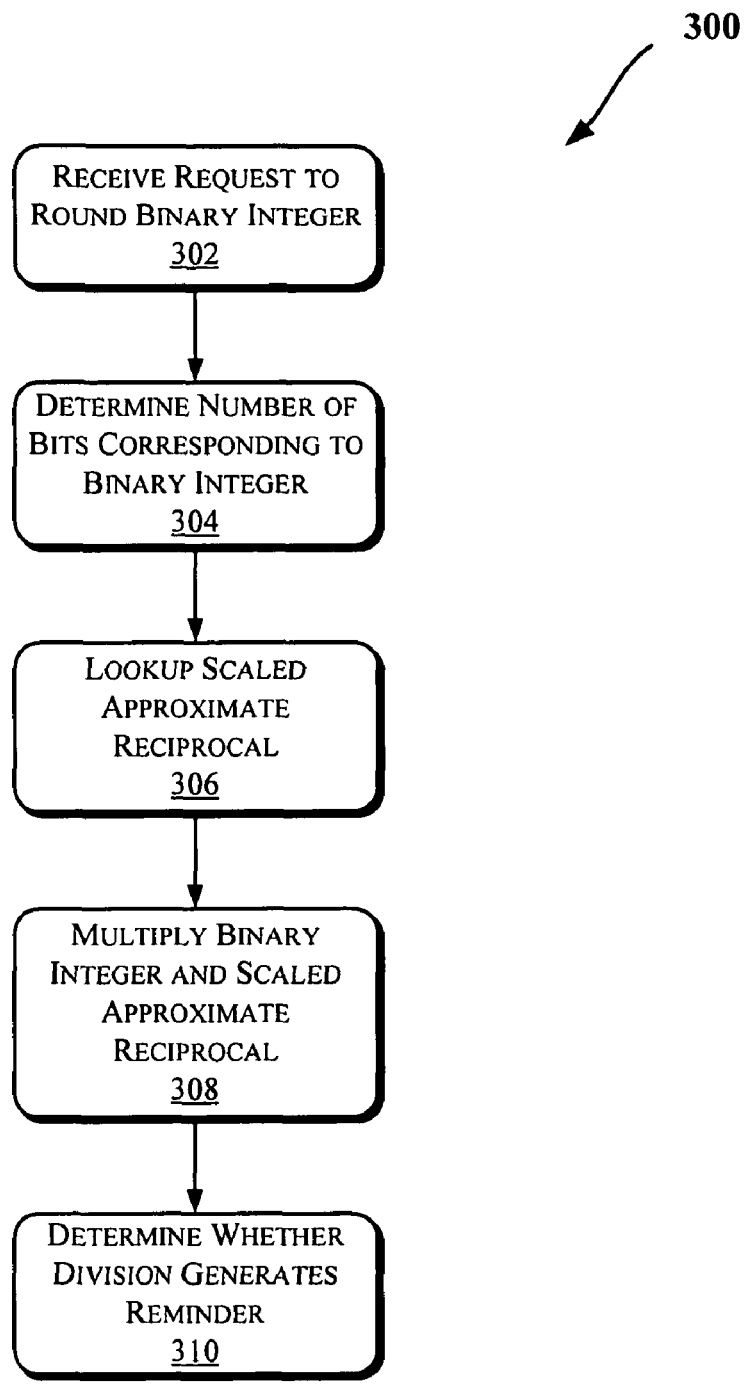
FIG. 3 illustrates a block diagram of a method in accordance with an embodiment of the invention.

FIG. 3 illustrates a block diagram of an embodiment of a method 300 to perform one or more operations corresponding to an integer rounding request. In an embodiment, various components discussed with reference to FIGS. 1-2 and 7-8 may be utilized to perform one or more of the operations discussed with reference to FIG. 3.

Referring to FIGS. 1-3, at an operation 302, a request to round a binary integer is received. In an embodiment, the request of the operation 302 may request a base-10 rounding of a binary integer. The request of operation 302 may correspond to an instruction stored in the memory 114 (e.g., as part of the application 250 in an embodiment) that is fetched by the fetch unit 202. The rounding logic 230 may determine the number of bits corresponding to the binary integer at an operation 304. For example, the logic 230 may count the number of leading zeros of the binary integer and deduct the number of leading zeros from the value stored in a container that indicates the total number of bits in the binary integer of operation 302.

At an operation 306, the rounding logic 230 may access the table 254 to lookup the value of a scaled approximate reciprocal that is used to obtain the integer quotient of the binary integer of operation 302 divided by a divisor. The execution unit 208 may multiply the binary integer and the scaled approximate reciprocal to generate a product at an operation 308. The rounding logic 230 may extract a value from the generated product of operation 308 to determine whether the division of the binary integer by the divisor generates a remainder at an operation 310, or the divisor divides the binary integer. As discussed above, operations 304, 306, and/or 310 may be performed by the logic 230. Alternatively, these operations may be performed by the logic 230 and/or a co-processor (not shown) in communication with various components of the core 106 of FIG. 2.

In an embodiment, given an integer X>0 and an integer divisor m>0, the method 300 may be utilized to compute the integer quotient Q as well as to determine if m divides X evenly (310). That is, $X=Q \times m+r$, $0 \leq r \leq m-1$, and the method 300 may obtain Q and know if r is 0 (310). If we let $X<2^U$ and $m<2^V$, we may define $S=U+V$ and the reciprocal factor $w=\text{ceiling}(2^S/m)$. Then, $wX=Q2^S+G$, where $0<=G<2^S$. Thus, Q may be obtained by wX right-shifted S bits, e.g., by utilizing the logic 230. Also, $G<2^V$ iff r=0. Hence, in the product wX, one may find both Q and the knowledge whether r is 0.

In one embodiment, given an integer X>0, the method 300 may determine the P leading significant decimal digits, e.g., for rounding of a binary integer in base 10. For instance, if X fits in P+c decimal digits, then the result of the rounding may be $X/10^c$, and it may be determined whether the rounding is exact, or whether 10 divides X evenly (e.g., with a zero remainder value). By examining the leading binary bit of X (304), a "d" value may be defined such that $10^{P+d-1}<x<10^{P+d+1}$ (e.g., where "c" may be either equal to "d" or "d+1"). Sample rounding based on integer division and divisibility is shown below in Tables 1 and 2. In particular, Table 1 indicates a round-to-nearest with tie case round up rounding (also referred to as "round-to-nearest-up" or "bankers" rounding) for two separate values as there may be an uncertainty of one decimal digit with respect to each division operation. In Table 1, "D" is the integer quotient portion of the division and a indicates whether the division is exact, and D' and σ' correspond to values associated with the case where X is to be rounded off by an extra decimal digit (e.g., where X fits in P+d+1 decimal digits). Additionally, in Table 1, "lsb" refers to the least significant bit. Moreover, in Table 1, 2× is utilized so "lsb" corresponds to a rounding bit that indicates whether a division operation provides an inexact division, e.g., when too many digits of X may be eliminated during rounding.

TABLE 1

| Compute | Return |
| --- | --- |
| D ← floor($2x/10^{d+1}$), σ ← ($10^{d+1}$|2x? 0:1) | If D ≧ 2 × $10^{P-1}$, return (D >> 1) + lsb(D), inexact flag (σ OR lsb(D)) |
| D' ← floor($20x/10^{d+1}$), σ' ← ($10^d$|2x? 0:1) | else return (D' >> 1) + lsb(D'), inexact flag (σ' OR lsb(D')) |

Table 2 below illustrates how rounding of X towards zero would be performed.

TABLE 2

| Compute | Return |
| --- | --- |
| D ← floor($x/10^{d+1}$), σ ← ($10^{d+1}$|x? 0:1) | If D ≧ $10^{P-1}$, return D, inexact flag σ |
| D' ← floor($10x/10^{d+1}$), σ' ← ($10^d$|x? 0:1) | else return D', inexact flag σ' |

Figure 4:
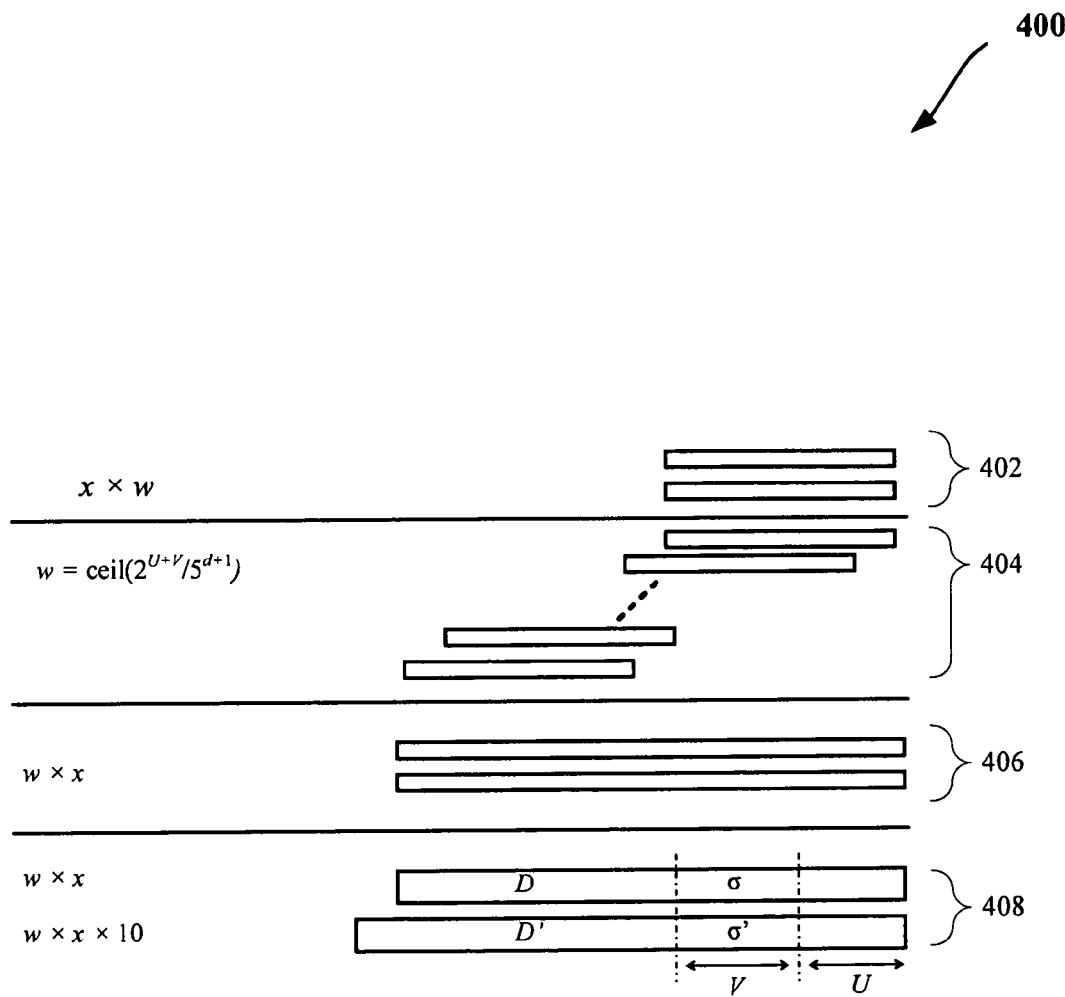
FIGS. 4-6 illustrate sample block diagrams of some arithmetic operations corresponding to rounding operations, in accordance with various embodiments.

FIG. 4 illustrates a block diagram of various arithmetic operations corresponding to a rounding operation 400, according to an embodiment. In an embodiment, FIG. 4 illustrates sample operations performed to provide the values discussed with reference to operation 308 of FIG. 3 and Tables 1-2.

As shown in FIG. 4, the binary integer (X) and scaled approximate reciprocal (w) (402) may be multiplied (404) and before the final carry propagation addition (CPA) (406) is performed, another product of 10 is carried out (product of 10 may include a shift operation and an add operation) on a carry-sum form. Thus, FIG. 4 illustrates how both possible solutions may be obtained (408).

Figure 5:
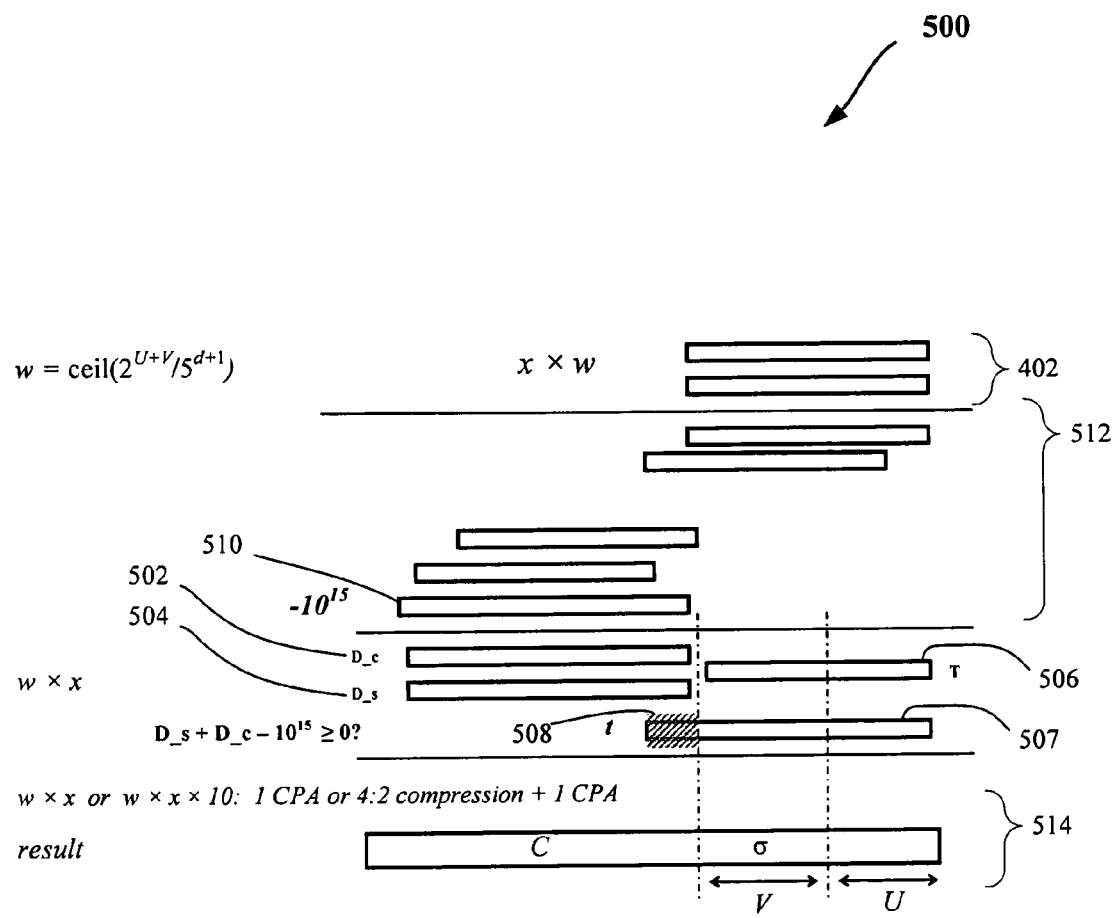

FIG. 5 illustrates a block diagram of various arithmetic operations corresponding to a rounding operation 500, according to an embodiment. In an embodiment, FIG. 5 illustrates sample operations performed to provide the values discussed with reference to operation 308 of FIG. 3 and Tables 1-2 above. To avoid having to store the two possible answers (e.g., at 408 of FIG. 4), carry and save format (e.g., 502 and 504, respectively) of wX may be transformed into first carrying out the CPA for the tail end (506). So "D" (discussed with reference to FIG. 4) may be in carry-save format (502, 504) and the tail end (506) may be in 2's complement format. Moreover, a copy of 10 times (or other multiple) of the tail end (507) may also be obtained in 2's complement form in an embodiment, e.g., to obtain both possible copies. In one embodiment, the leading part of the "t" (508) which overlaps with D_c (502) and D_s (504) is shown in alignment in FIG. 5. Accordingly, from D_s (504) and D_c (502), it may be known (e.g., by D_s+D_c−10^15) whether w-times-X or 10 times w-times-X are to be selected as an answer. If w-times-X is to be selected, then D_s+D_c is the integer quotient, and the "T" part (506) indicates the divisibility information. If 10 times w-times-X is to be selected, then 10 times (D_c+D_s+T) is utilized. Hence, 10-times-T may be already computed. So integer quotient of 10 times w-times-X is 10×(D_s+D_c)+"t". And the trailing part following "t" provides the divisibility information of 10 times w-times-X. Furthermore, to determine which answer is selected, a fixed constant $10^{15}$ (for the 16 decimal digit case (510)) may be subtracted from the computed value (512). The rounding logic 230 (and/or the execution unit 208) may perform the operations shown in FIG. 5 in an embodiment. Moreover, the last operation (514) to obtain the result may be done by performing a CPA or one more compression operations (e.g., a 4:2 compression) before a CPA.

Figure 6:
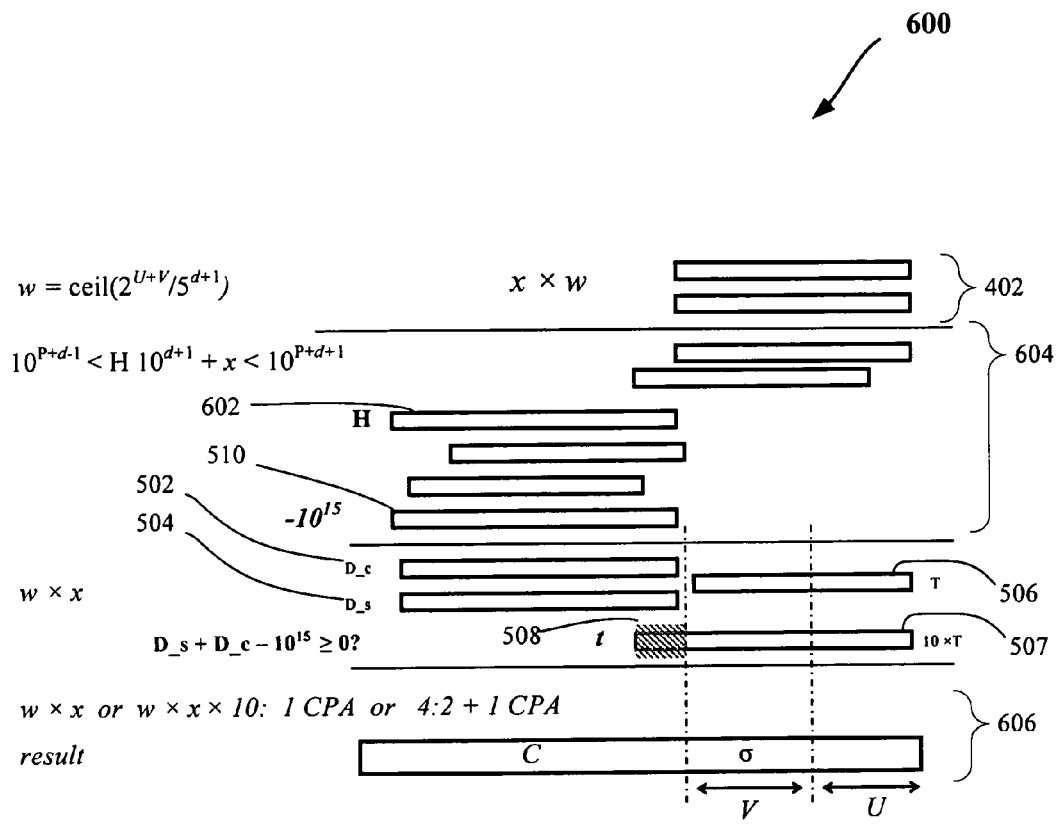

FIG. 6 illustrates a block diagram of various arithmetic operations corresponding to a rounding operation 600, according to an embodiment. In an embodiment, FIG. 6 illustrates sample operations performed to provide the values discussed with reference to operation 308 of FIG. 3 and Tables 1-2 above. In one embodiment, if a portion of a value to be rounded (X) may be expressed as a leading portion (602) (e.g., X=X'+$10^{d+1}$ H, where H is the leading portion), the rounding logic 230 (and/or the execution unit 208) may include circuitry to utilize this situation when compared with the operations discussed with reference to FIGS. 4-5. For example, the value of "d" may be determined such that: $10^{P+d-1}$ ≦ $H10^{d+1}$+X < $10^{P+d+1}$.

As shown in FIG. 6, the value of H (602) may be provided during operation (604) to enhance hardware operation efficiency in providing the result (606). Table 3 below illustrates sample values that may be stored in the table 254 of FIG. 2.

TABLE 3

Sample Values Stored in Table 254

| b | d | tight | V | w = ceil($2^{U+V-1}/5^{d+1}$), U = 39 |
| --- | --- | --- | --- | --- |
| 20 | 2 | 0 | 8 | 562949953422 |
| 21 | 2 | 1 | 8 | 562949953422 |
| 22 | 2 | 1 | 8 | 562949953422 |
| 23 | 2 | 1 | 8 | 562949953422 |
| 24 | 3 | 0 | 11 | 900719925475 |
| 25 | 3 | 1 | 11 | 900719925475 |
| 26 | 3 | 1 | 11 | 900719925475 |
| 27 | 4 | 0 | 13 | 720575940380 |
| 28 | 4 | 1 | 13 | 720575940380 |
| 29 | 4 | 1 | 13 | 720575940380 |
| 30 | 5 | 0 | 15 | 576460752304 |
| 31 | 5 | 1 | 15 | 576460752304 |
| 32 | 5 | 1 | 15 | 576460752304 |
| 33 | 5 | 1 | 15 | 576460752304 |
| 34 | 6 | 0 | 18 | 922337203686 |
| 35 | 6 | 1 | 18 | 922337203686 |
| 36 | 6 | 1 | 18 | 922337203686 |
| 37 | 7 | 0 | 20 | 737869762949 |
| 38 | 7 | 1 | 20 | 737869762949 |
| 39 | 7 | 1 | 20 | 737869762949 |
| 40 | 8 | 0 | 22 | 590295810359 |
| 41 | 8 | 1 | 22 | 590295810359 |
| 42 | 8 | 1 | 22 | 590295810359 |
| 43 | 8 | 1 | 22 | 590295810359 |
| 44 | 9 | 0 | 25 | 944473296574 |
| 45 | 9 | 1 | 25 | 944473296574 |
| 46 | 9 | 1 | 25 | 944473296574 |
| 47 | 10 | 0 | 27 | 755578637260 |
| 48 | 10 | 1 | 27 | 755578637260 |
| 49 | 10 | 1 | 27 | 755578637260 |
| 50 | 11 | 0 | 29 | 604462909808 |

For simplicity, in the embodiment that corresponds to Table 3, the integer to be rounded may fit in 50 binary bits (X<$2^{50}$), the precision of the arithmethic may be 6 decimal digits (e.g., P=6), and the rounding may be performed towards zero (that is truncating to 6 decimal digits) while reporting the "inexact" information (corresponding to operation 310).

Referring to FIGS. 1-6 and Tables 1-3, given 0<X<$2^{50}$, by counting leading zeros (304), the most significant bit of X may be determined. That is, we obtain a value 1≦b such that $2^{b-1}$≦X<$2^b$. In other words, X may fit in b binary bits. Note that this b may have a finite range: it may take on values from 1 to 50 for the example of Table 3. No rounding operation may be necessary if $2^b$<$10^P$ (that is, X fits in P decimal digits). In the latter case, as long as b≦19, no rounding is necessary (so $20 \leq b \leq 50$). Based on b, the corresponding value of d may be obtained from Table 3 (at operation 306), where:

$$10^{P+d-1} < 2^{b-1}, 2^b < 10^{P+d+1}.$$

Therefore, X lies between $10^{P+d-1}$ and $10^{P+d+1}$. In other words, X is at most P+d+1 decimal digits, and at least P+d digits. Moreover, Table 3 may provide a "tight" flag. This flag, when set to 1, may indicate that in fact $10^{P+d} < 2^{b-1}$, $2^b < 10^{P+d+1}$. That is, the tight flag is set to 1 if in fact X has P+d+1 decimal digits. Given the value of d, the rounding operations in general may be performed by either $X/10^{d+1}$ or $X/10^d$.(e.g., do to the uncertainty of truncation). As discussed with reference to FIGS. 4-6, the scheme of computing both of these values (e.g., D and D') and picking one from the two results would provide the result at operation 310. Alternatively, when the "tight" flag shown in Table 3 is set to 1, it may be determined a priori that the rounding operation corresponds to $X/10^{d+1}$.

As discussed with reference to Tables 1-2 and FIGS. 4-6, D and a may be generated where D is the integer quotient of $X/10^{d+1}$ (that is $X/10^{d+1}$ truncated to an integer) and σ is the inexact flag where σ=0 if and only if $10^{d+1}$ divides X evenly. In an embodiment, the logic 230 may determine the value of y, where y←X right shifted by d bits (or where y is obtained by right-shifting X by d bits, thus $y=X/2^d$ truncated to an integer_. That is y is $X/2^d$ truncated to an integer. Moreover, the value of σ2 may be obtained which corresponds to the inexact flag of this operation. So, σ2=1 if and only if there are some non-zero bits in the d least significant bits of X that are shifted off. In other words, σ2 is 1 if and only if X is not divisible by $2^d$. As shown in Table 3, for this example y fit in 39 bits. Based on the d value, the corresponding scaled approximate reciprocal (w) may be fetched from the Table 3 at operation 306 (e.g., where w may be an approximate reciprocal of $2 \times 5^{d+1}$ in an embodiment). In an embodiment, the formula for the w value is given by: $w = \text{ceil}(2^{U+V}/(2 \times 5^{d+1}))$ where U=39 (because $y < 2^{39}$) and V is chosen so that $2 \times 5^{d+1} < 2^V$. Table 3 tabulates the b value and its corresponding d, V, and w. The value of w shown in Table 3 is in decimal representation.

At operation 308, in an embodiment, the product of y and w (e.g., z=yw) may be computed. As discussed with reference to Tables 1-2 and FIGS. 4-6, the bits to the left of U+V (which is 39+V bits for the example of Table 3) may contain D, and the V bits to the left of U=39 bits indicate the δ inexact flag (for yw operation): that is δ is 0 if and only if the corresponding V bits are all zero. The δ may be the inexact flag for y divided by $2 \times 5^{d+1}$. From δ and σ2, we may obtain σ by σ←δ OR σ2. That is $X/10^{d+1}$ is inexact if either $X/2^d$ is inexact or $y/(2 \times 5^{d+1})$ is inexact.

As discussed with reference to Tables 1-2 and FIG. 4, the value of D' and σ' may also be generated which respectively correspond to the integer quotient of $X/10^d$ and the corresponding inexact flag. In one embodiment such as discussed with reference to FIG. 4, once we have the value of z, we may obtain z'=10×z and the value of D' and σ' is extracted in a similar fashion. In an embodiment, multiplication by 10 may involve 1 addition because 10z=2(4z+z). Also, the corresponding value of δ' may be the inexact flag for $y/5^d$. Thus, σ' may be obtained by σ'←δ' OR σ2'. That is, $X/10^d$ is inexact if either $X/2^d$ is inexact or $y/5^d$ is inexact.

Figure 7:
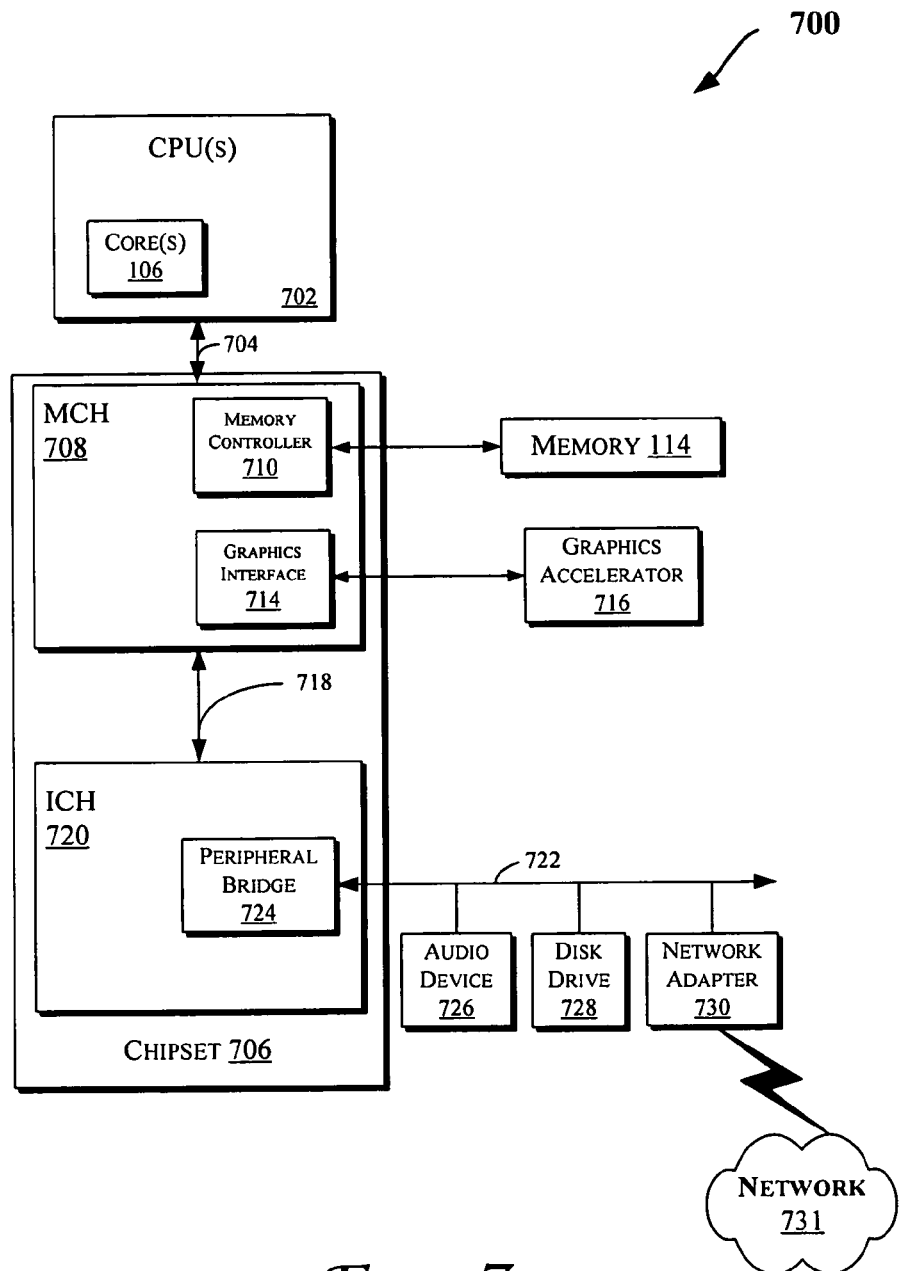

FIG. 7 illustrates a block diagram of an embodiment of a computing system 700. The computing system 700 may include one or more central processing unit(s) (CPUs) or processors 702 that communicate with an interconnection (or bus) 704. In an embodiment, the processors 702 may be the same as or similar to the processors 102 of FIG. 1. Also, the interconnection 704 may be the same as or similar to the interconnections 104 and/or 112 discussed with reference to FIGS. 1-2. The processors 702 may include any type of a processor such as a general purpose processor, a network processor (e.g., a processor that processes data communicated over a computer network), or another processor, including a reduced instruction set computer (RISC) processor or a complex instruction set computer (CISC) processor. Moreover, the processors 702 may have a single or multiple core design, e.g., including one or more processor cores (106) such as discussed with reference to FIGS. 1-2. The processors 702 with a multiple core design may integrate different types of processor cores on the same integrated circuit (IC) die. Also, the processors 702 with a multiple core design may be implemented as symmetrical or asymmetrical multiprocessors.

As shown in FIG. 7, a chipset 706 may communicate with the interconnection 704. The chipset 706 may include a memory control hub (MCH) 708. The MCH 708 may include a memory controller 710 that communicates with the memory 114. The memory 114 may store data, e.g., including sequences of instructions that are executed by the processors 702, or any other device in communication with the computing system 700. In one embodiment of the invention, the memory 114 may include one or more volatile storage (or memory) devices such as random access memory (RAM), dynamic RAM (DRAM), synchronous DRAM (SDRAM), static RAM (SRAM), or other volatile memory devices. Non-volatile memory may also be used such as a hard disk. Additional devices may communicate via the interconnection 704, such as multiple processors and/or multiple system memories.

The MCH 708 may additionally include a graphics interface 714 in communication with a graphics accelerator 716. In one embodiment, the graphics interface 714 may communicate with the graphics accelerator 716 via an accelerated graphics port (AGP). In an embodiment of the invention, a display (such as a flat panel display) may communicate with the graphics interface 714 through, for example, a signal converter that translates a digital representation of an image stored in a storage device such as video memory or system memory into display signals that are interpreted and displayed by the display. In various embodiments, the display signals produced by the display device may pass through various control devices before being interpreted by and subsequently displayed on the display.

Furthermore, a hub interface 718 may enable communication between the MCH 708 and an input/output (I/O) control hub (ICH) 720. The ICH 720 may provide an interface to I/O devices in communication with the computing system 700. The ICH 720 may communicate with a bus 722 through a peripheral bridge (or controller) 724, such as a peripheral component interconnect (PCI) bridge or a universal serial bus (USB) controller. The bridge 724 may provide a data path between the processor 702 and peripheral devices. Other types of topologies may be utilized. Also, multiple buses may communicate with the ICH 720, e.g., through multiple bridges or controllers. Moreover, other peripherals in communication with the ICH 720 may include, in various embodiments of the invention, integrated drive electronics (IDE) or small computer system interface (SCSI) hard drive(s), USB port(s), a keyboard, a mouse, parallel port(s), serial port(s), floppy disk drive(s), or digital data support interfaces (e.g., digital video interface (DVI)).

The bus 722 may communicate with an audio device 726, one or more disk drive(s) 728, and a network adapter 730. The network adapter 730 may communicate with a computer network 731, e.g., enabling various components of the system 700 to send and/or receive data over the network 731. Other devices may communicate through the bus 722. Also, various components (such as the network adapter 730) may communicate with the MCH 708 in some embodiments of the invention. In addition, the processor 702 and the MCH 708 may be combined to form a single chip. Furthermore, the graphics accelerator 716 may be included within the MCH 708 in other embodiments of the invention.

In an embodiment, the computing system 700 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 728), a floppy disk, a compact disk ROM (CD-ROM), a digital versatile disk (DVD), flash memory, a magneto-optical disk, or other types of nonvolatile machine-readable media for storing electronic data (e.g., including instructions).

Figure 8:
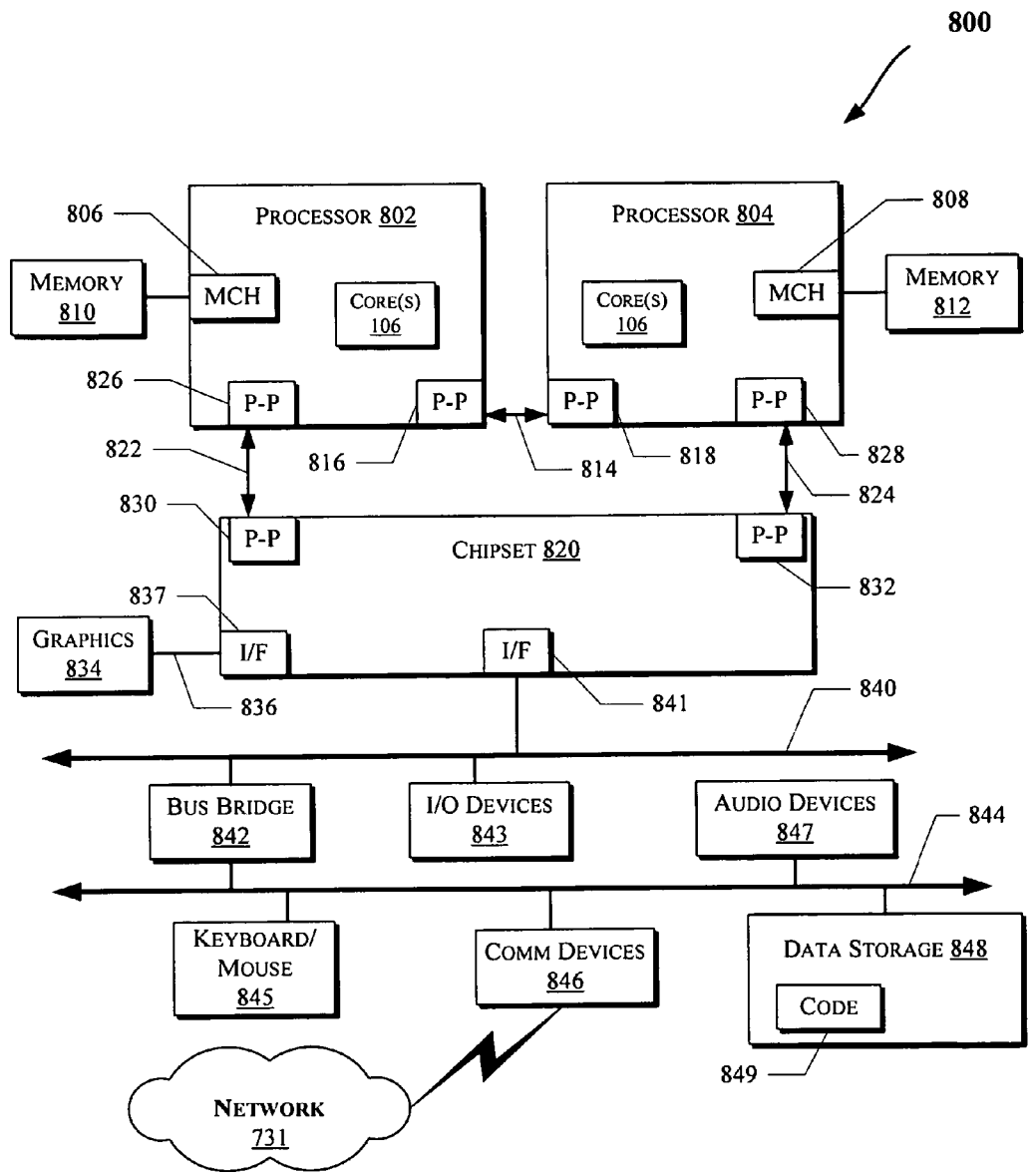

FIG. 8 illustrates a computing system 800 that is arranged in a point-to-point (PtP) configuration, according to an embodiment of the invention. In particular, FIG. 8 shows a system where processors, memory, and input/output devices are interconnected by a number of point-to-point interfaces. The operations discussed with reference to FIGS. 1-7 may be performed by one or more components of the system 800.

As illustrated in FIG. 8, the system 800 may include several processors, of which only two, processors 802 and 804 are shown for clarity. The processors 802 and 804 may each include a local memory controller hub (MCH) 806 and 808 to enable communication with memories 810 and 812. The memories 810 and/or 812 may store various data such as those discussed with reference to the memory 114 of FIGS. 1-2 and 7.

In an embodiment, the processors 802 and 804 may be one of the processors 702 discussed with reference to FIG. 7. The processors 802 and 804 may exchange data via a point-to-point (PtP) interface 814 using PtP interface circuits 816 and 818, respectively. Also, the processors 802 and 804 may each exchange data with a chipset 820 via individual PtP interfaces 822 and 824 using point-to-point interface circuits 826, 828, 830, and 832. The chipset 820 may further exchange data with a high-performance graphics circuit 834 via a high-performance graphics interface 836, e.g., using a PtP interface circuit 837.

At least one embodiment of the invention may be provided within the processors 802 and 804. For example, one or more of the cores 106 of FIG. 1 or 2 may be located within the processors 802 and 804. Other embodiments of the invention, however, may exist in other circuits, logic units, or devices within the system 800 of FIG. 8. Furthermore, other embodiments of the invention may be distributed throughout several circuits, logic units, or devices illustrated in FIG. 8. The chipset 820 may communicate with a bus 840 using a PtP interface circuit 841. The bus 840 may have one or more devices that communicate with it, such as a bus bridge 842 and I/O devices 843. Via a bus 844, the bus bridge 843 may communicate with other devices such as a keyboard/mouse 845, communication devices 846 (such as modems, network interface devices (e.g., the network adapter 730 of FIG. 7), or other communication devices that may communicate with the computer network 731), audio I/O device, and/or a data storage device 848. The data storage device 848 may store code 849 that may be executed by the processors 802 and/or 804.

In various embodiments of the invention, the operations discussed herein, e.g., with reference to FIGS. 1-8, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-8. Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection). Accordingly, herein, a carrier wave shall be regarded as comprising a machine-readable medium.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A processor comprising:
a storage unit to store a first value corresponding to a scaled approximate reciprocal of a divisor value; and
a first logic to extract a second value from a product of the first value and a third value, the second value to indicate whether the divisor value divides the third value, without determining a remainder of a division of the third value by the divisor value.

2. The processor of claim 1, further comprising a second logic to multiply the first value and the third value to generate the product.

3. The processor of claim 1, wherein the second value corresponds to one or more less significant bits of the product that immediately follow one or more bits of the product that correspond to an integer quotient portion of the product.

4. The processor of claim 3, wherein the one or more less significant bits correspond to a number of binary bits in which the divisor value fits.

5. The processor of claim 1, wherein the first logic right shifts the product by a number of binary bits in which the third value fits and wherein the second value corresponds to one or more least significant bits of a remaining portion of the product that correspond to a number of binary bits in which the divisor value fits.

6. The processor of claim 1, further comprising a second logic to extract a fourth value from the product that corresponds to an integer quotient of a division of the third value by the divisor value.

7. The processor of claim 6, wherein to extract the fourth value, the second logic right shifts the product by a number of binary bits that correspond to a fifth value, wherein the fifth value corresponds to a total number of binary bits in which the third value and the divisor value fit.

8. The processor of claim 1, wherein the storage unit stores a fourth value corresponding to a number of binary bits in which the third value fits.

9. The processor of claim 8, further comprising a second logic to extract a fifth value in accordance with the fourth value, wherein the fifth value indicates whether the divisor value divides the third value.

10. The processor of claim 9, wherein to extract the fifth value, the second logic right shifts the third value by a number of binary bits that correspond to the fourth value.

11. The processor of claim 1, further comprising:
a second logic to multiply one or more bits of the third value by one or more bits of the scaled approximate reciprocal of the divisor value; and
a third logic to add one or more products generated by the second logic.

12. The processor of claim 11, wherein the third logic adds a leading portion corresponding to the third value to the one or more products generated by the second logic.

13. The processor of claim 11, wherein the third logic adds a constant value corresponding to a precision of the product to the one or more products generated by the second logic.

14. The processor of claim 1, further comprising a plurality of processor cores, wherein at least one of the plurality of processor cores comprises one or more of the storage unit or the first logic.

15. The processor of claim 14, wherein at least two of the plurality of processor cores are on a same die.

16. The processor of claim 1, wherein the third value corresponds to a binary integer.

17. A method comprising:
determining, at a processor, a first value corresponding to a number of binary bits in which a binary integer fits;
determining a second value corresponding to an approximate reciprocal of a divisor value based on the first value;
multiplying the second value with the binary integer to generate a third value; and
extracting a fourth value from the third value corresponding to a remainder status of a division operation that divides the binary integer by the divisor value, without determining a remainder of a division of the third value by the divisor value.

18. The method of claim 17, wherein extracting the fourth value comprises extracting at least a subset bit field of the third value.

19. The method of claim 17, wherein determining the first value comprises determining a most significant bit of the binary integer, wherein a number of bits in the binary integer starting with the most significant bit of the binary integer indicates the first value.

20. The method of claim 17, further comprising receiving a request to round the binary integer.

21. A system comprising:
a memory to store a binary integer;
a processor core to fetch the binary integer, the processor core to comprise logic to generate an inexact division flag based on a product of the binary integer and a scaled approximate reciprocal of a divisor value, without determining a remainder of a division of the third value by the divisor value.

22. The system of claim 21, wherein the inexact division flag corresponds to a value extracted from one or more bits of the product.

23. The system of claim 21, further comprising an arithmetic logic unit to multiply the binary integer and the scaled approximate reciprocal of the divisor value.

24. The system of claim 21, wherein the inexact division flag corresponds to one or more less significant bits of the product that immediately follow one or more bits of the product that correspond to an integer quotient portion of the product.

25. The system of claim 21, further comprising a table to store one or more values corresponding to the scaled approximate reciprocal of the divisor value.

26. The system of claim 25, wherein the one or more stored values comprise one or more of: a first value corresponding to a number of binary bits in which the binary integer fits and a second value corresponding to a number of binary bits in which the divisor value fits.

27. The system of claim 21, further comprising an audio device.

28. A computer-readable storage medium comprising one or more instructions that when executed on a processor configure the processor to:
generate a first value corresponding to a scaled approximate reciprocal of a divisor value; and
generate a second value corresponding to a number of binary bits in which the divisor value fits, without determining a remainder of a division of the third value by the divisor value.

29. The computer-readable storage medium of claim 28, further comprising one or more instructions to configure the processor to store one or more of the first or second values in a storage unit.

30. The computer-readable storage medium of claim 29, wherein the storage unit comprises one or more of a nonvolatile storage unit or a volatile storage unit.

* * * * *